United States Patent
Wu et al.

(10) Patent No.: US 8,514,594 B2
(45) Date of Patent: Aug. 20, 2013

(54) METHOD AND APPARATUS FOR CONTROLLING POWER CONVERTER OUTPUT CHARACTERISTICS

(75) Inventors: Quanqing Wu, Shanghai (CN); Kwok Pun Ho, Shanghai (CN)

(73) Assignee: BCD Semiconductor Manufacturing Limited, George Town, Grand Cayman (KY)

( * ) Notice: Subject to any disclaimer, the term of this patent is extended or adjusted under 35 U.S.C. 154(b) by 361 days.

(21) Appl. No.: 12/559,098

(22) Filed: Sep. 14, 2009

(65) Prior Publication Data

US 2011/0019445 A1   Jan. 27, 2011

(30) Foreign Application Priority Data

Jul. 22, 2009  (CN) .......................... 2009 1 0164772

(51) Int. Cl.
*H02M 3/335*  (2006.01)

(52) U.S. Cl.
USPC ..................................... 363/21.12; 363/21.16

(58) Field of Classification Search
USPC ........................ 363/21.04, 21.08, 21.12, 21.16
See application file for complete search history.

(56) References Cited

U.S. PATENT DOCUMENTS

| | | | | |
|---|---|---|---|---|
| 5,917,716 A * | 6/1999 | Cho | ............................ | 363/21.14 |
| 6,320,363 B1 * | 11/2001 | Oglesbee et al. | ............. | 323/303 |
| 7,116,563 B2 * | 10/2006 | Hua | ............................ | 363/21.06 |
| 7,518,836 B2 * | 4/2009 | Kim et al. | ........................ | 361/18 |
| 7,554,826 B2 * | 6/2009 | Hawley | .......................... | 363/124 |
| 7,881,077 B2 * | 2/2011 | Hsu | ............................... | 363/21.12 |
| 7,898,826 B2 * | 3/2011 | Matthews | .................... | 363/21.17 |
| 2003/0048645 A1 * | 3/2003 | Hosotani et al. | ............ | 363/21.12 |
| 2008/0225563 A1 * | 9/2008 | Seo | .................................. | 363/123 |
| 2010/0142230 A1 * | 6/2010 | Schroder Genannt Berghegger | ............... | 363/21.12 |
| 2010/0208500 A1 * | 8/2010 | Yan et al. | ..................... | 363/21.12 |
| 2010/0320973 A1 * | 12/2010 | Nishida | .......................... | 320/145 |

* cited by examiner

*Primary Examiner* — Adolf Berhane
*Assistant Examiner* — Fred E Finch, III
(74) *Attorney, Agent, or Firm* — Kilpatrick Townsend & Stockton LLP

(57) ABSTRACT

A power converter includes a primary winding for providing a primary current, a secondary winding for providing an output current and an output voltage, and a current sense node for receiving a current sense signal related to the primary current. The power converter also includes a control circuit configured to limit the current sense signal to be lower than or equal to a predetermined reference peak current. Moreover, the power converter includes a first circuit configured to modify the current sense signal using a first signal related to the output voltage to cause an variation in the output current.

24 Claims, 13 Drawing Sheets

METHOD AND APPARATUS FOR CONTROLLING POWER CONVERTER OUTPUT CHARACTERISTICS

CROSS-REFERENCES TO RELATED APPLICATIONS

This application claims priority to Chinese Patent Application No. 200910164772.8, filed Jul. 22, 2009, commonly assigned and incorporated by reference in its entirety herein for all purposes.

BACKGROUND OF THE INVENTION

The present invention is directed to power supply control circuits. More particularly, the invention provides methods and apparatus for a power converter control circuit for controlling the output current-voltage (I-V) characteristics of a switching mode power supply.

Regulated power supplies are indispensable in modern electronics. For example, the power supply in a personal computer often needs to receive power input from various outlets. Desktop and laptop computers often have regulated power supplies on the motherboard to supply power to the CPU, memories, and periphery circuitry. Regulated power supplies are also used in a wide variety of applications, such as home appliances, automobiles, and portable chargers for mobile electronic devices, etc.

Pulse Width Modulation (PWM) and Pulse Frequency Modulation (PFM) are two alternative control architectures of switching mode power supplies. In recent years, green power supplies are emphasized, which require higher conversion efficiency and lower standby power consumption. In a PWM controlled switching mode power supply, the system can be forced to enter into burst mode in standby conditions to reduce power consumption. In a PFM controlled switching mode power supply, the switching frequency can be reduced in light load conditions. A PFM-controlled switching mode power supply exhibits simple control topology and small quiescent current. Therefore, it is suitable for low cost small output power applications such as battery chargers and adapters, and cooling fan speed control for a personal computer system.

The control operation in a switch mode power supply (SMPS) can be implemented using different techniques, for example, depending on whether the SMPS uses primary-side-regulation (PSR) or secondary-side-regulation (SSR). In SSR, the control of the power supply output characteristics is based on sensing the output current or voltage at the secondary side (output side) of the transformer. The sensed signal is provided by a feedback mechanism, e.g., via an opto-coupler, to the SMPS controller, which controls the primary side current of the transformer.

In contrast, in primary side regulation (PSR), the power supply output current or voltage is not directly sampled at the output side. Instead, a primary side auxiliary winding is used to sense the current or voltage in the primary winding or secondary winding of the transformer. The PSR design is finding increasingly widespread applications, because it can provide high performance and cost effectiveness. In one aspect, the output (secondary side) circuitry of the power supply can be simplified. Moreover, in many power supplies, an auxiliary winding is often used to provide operating power for the controller. In these cases, the auxiliary winding can also provide the sensing function without added cost.

FIG. 1 illustrates an output I-V characteristics for a power supply in applications such as battery chargers and power adapters. As shown, the output voltage versus output current plot exhibits a vertically folded back curve. In a constant voltage (CV) mode 101, the power supply provides a constant output voltage which is substantially independent of the output current. In a constant current (CC) mode 102, the power supply provides a constant current substantially independent of output voltage. In the constant mode, the power supply can provide a constant current at a low output voltage.

Even thought power converters having output current-voltage characteristic of FIG. 1 have been used in many applications, they may not be suited for certain applications, as described in more detail below. Therefore, there is a need for methods and apparatus that can provide more general output current-voltage characteristics in a power supply.

BRIEF SUMMARY OF THE INVENTION

The present invention is directed to power supply control circuits. More particularly, the invention provides methods and apparatus for a power converter control circuit for controlling the output I-V characteristics of a SMPS. Merely by way of example, the invention has been applied to a PFM control circuit for power converters having certain output I-V characteristics. However, the method and apparatus described herein can be applied to other types of converters, for example, PWM or SSR controllers. There can be many other variations, modifications, and alternatives.

In some embodiments, the invention provides a method that includes modifying a current sense signal or a conduction duty ratio using a signal related to at least one feedback voltage signal to cause the output current to vary with the output voltage. In a specific example, the output current is configured to increase with decreasing output voltage. In another example, the output current is configured to increase with decreasing output voltage in a first output voltage range, and to be reduced in a second output voltage range to less than a maximum current that is available in the first voltage range. Of course, there can be many other variations, modifications, and alternatives.

According to an embodiment of the invention, a method for controlling an output current of a power converter includes receiving a current sense signal related to a current in a primary winding in the power converter and limiting the current sense signal to be lower than or equal to a predetermined reference peak current. The method also includes modifying the current sense signal using a first signal related to an output voltage of the power converter to cause the output current to increase with decreasing output voltage.

In an embodiment of the above method modifying the current sense signal includes adding the first signal to the current sense signal using at least a resistor. In another embodiment. In another embodiment, the method also includes modifying the current sense signal using a second signal related to the output voltage of the power converter to cause the output current to vary with the output voltage. In another embodiment, the output current is configured to increase with decreasing output voltage until the output current reaches a maximum current in a first output voltage range, and causing the output current to be lower than the maximum current in a second output voltage range.

In another embodiment, the power converter is configured to maintain a conduction duty ratio in the power converter. The method also includes modifying the conduction duty ratio using at least a signal related to the output voltage of the power converter to cause the output current to vary with the output voltage.

According to another embodiment of the invention, a power converter includes a primary winding for providing a primary current, a secondary winding for providing an output current and an output voltage, and a current sense node for receiving a current sense signal related to the primary current. The power converter also includes a control circuit configured to limit the current sense signal to be lower than or equal to a predetermined reference peak current. Moreover, the power converter includes a first circuit configured to modify the current sense signal using a first signal related to the output voltage to cause an variation in the output current.

In an embodiment of the above converter the controller is configured to cause the output current to increase with decreasing output voltage. In another embodiment, the first circuit includes at least a resistor. In another embodiment, the first circuit and the control circuit is included in a single integrated circuit chip.

In another embodiment of the converter, a second circuit is configured to modify the current sense signal using a second signal related to the output voltage of the power converter to cause the output current to vary with the output voltage. In another embodiment, the controller is configured to cause the output current to increase with decreasing output voltage until the output current reaches a maximum current and to cause the output current to be lower than the maximum current in a second output voltage range. In another embodiment, the second circuit comprises a transistor, a Zener device, and a resistor.

In another embodiment of the converter, the first circuit, the second circuit, and the control circuit are included in a single integrated circuit chip. In another embodiment, the control circuit is included in a single integrated circuit chip, and the first circuit and the second circuit comprise discrete components. In yet another embodiment, the control circuit is further configured to maintain a conduction duty ratio in the power converter, and the converter is further configured to modify the conduction duty ratio using at least a signal related to the output voltage of the power converter to cause the output current to vary with the output voltage.

According to an alternative embodiment, a controller for a power converter includes a current sense node for receiving a current sense signal related to a current in a primary winding in the power converter, and a control circuit configured to limit the current sense signal to be lower than or equal to a predetermined reference peak current. The controller also includes a first circuit configured to modify the current sense signal using a first signal related to an output voltage of the power converter to cause an output current to vary with the output voltage.

In an embodiment, the controller is configured to cause the output current to increase with decreasing output voltage. In another embodiment, the first circuit includes at least a resistor. In another embodiment, the first circuit and the control circuit are included in a single integrated circuit chip.

In another embodiment of the controller, a second circuit is configured to modify the current sense signal using a second signal related to the output voltage of the power converter to cause the output current to vary with the output voltage. In another embodiment, the controller is configured to cause the output current to increase with decreasing output voltage until the output current reaches a maximum current and to cause the output current to be lower than the maximum current in a second output voltage range. In another embodiment, the second circuit comprises a transistor, a Zener device, and a resistor.

In another embodiment of the controller, the first circuit, the second circuit, and the control circuit are included in a single integrated circuit chip. In another embodiment, the control circuit is included in a single integrated circuit chip, and the first circuit and the second circuit comprise discrete components. In yet another embodiment, the control circuit is further configured to maintain a conduction duty ratio in the power converter, and the controller is further configured to modify the conduction duty ratio using at least a signal related to the output voltage of the power converter to cause the output current to vary with the output voltage.

A further understanding of the nature and advantages of the present invention may be realized by reference to the remaining portions of the specification and the drawings.

DETAILED DESCRIPTION OF THE INVENTION

Figure 2:
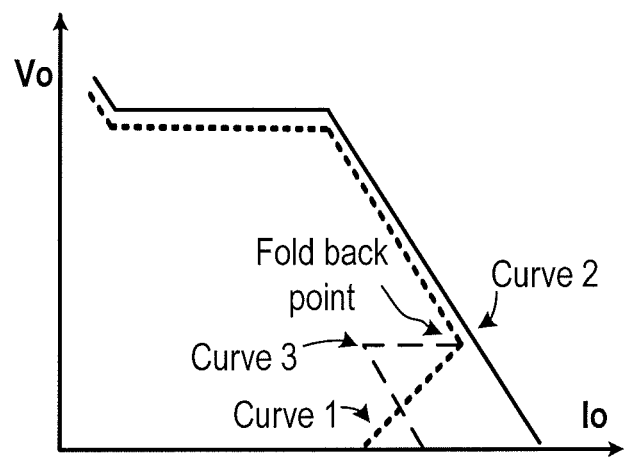
FIG. 2 is a simplified drawing illustrating a current-voltage (I-V) characteristic of a power converter according to an embodiment of the present invention.

As described above, a conventional power converter often has a current-voltage (I-V) curve that is divided in a constant-voltage (CV) region and a constant current (CC) region. However, some applications may require a power converter to provide different I-V characteristics. FIG. 2 is a simplified drawing illustrating current-voltage (I-V) characteristic of a power converter according to embodiments of the present invention. In some applications, the load may consume a larger current with decreasing output voltage, and then a relatively low output current when output voltage drops to zero (output short), e.g., after a fold back point, as illustrated by curve 1 in FIG. 2. In some applications, the load may consume a larger current with lower output voltage, as illustrated by curve 2 in FIG. 2. In other applications, it may be desirable to have an I-V characteristic such as illustrated by curve 3 in FIG. 2, in which the current-voltage relationship is changed beyond the fold back point. For example, in curve 3, the output current reaches a maximum current at the fold back point, and for lower output voltages, the output current stays lower than the maximum current. Embodiments of the present invention provide methods and apparatus that can be used to tailor output I-V characteristics for specific applications, such as those shown in FIG. 2.

Figure 3:
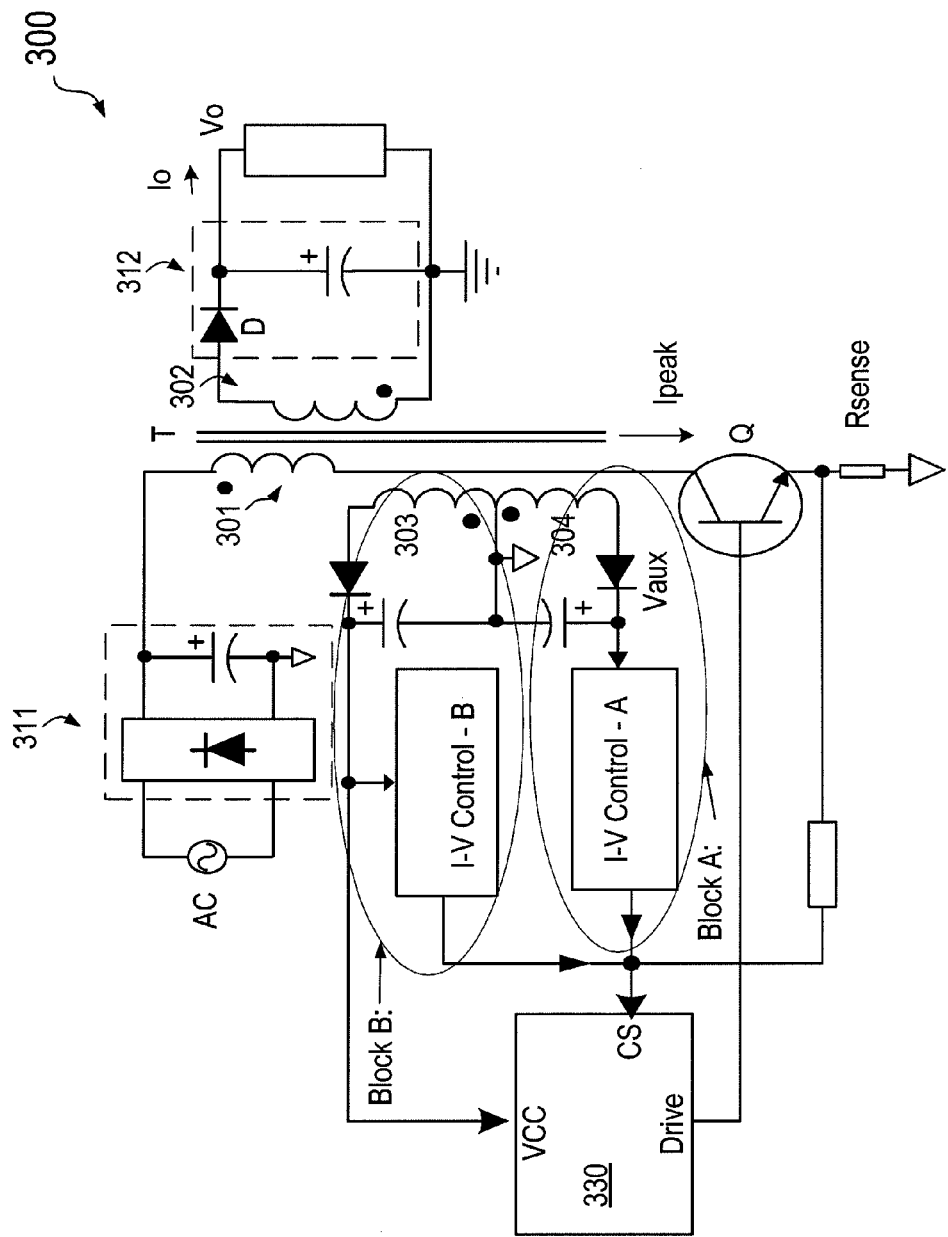
FIG. 3 is a simplified block diagram of a power converter according to an embodiment of the present invention.

FIG. 3 is a simplified block diagram of a power converter 300 according to an embodiment of the present invention. As shown, power converter 300 has a transformer T, which includes a primary winding 301, a secondary winding 302, and auxiliary windings 303 and 304. Primary winding 301 is coupled to an AC input power source through a rectifier circuit 311. The power converter's output current Io and output voltage Vo are provided by secondary winding 302 through a rectifying circuit 312. The current flow in primary winding 301 is controlled by a power transistor Q, which receives a control signal from a power controller 330. The maximum current flow is indicated as Ipeak in FIG. 3. In the embodiment of FIG. 3, controller 330 is an integrated circuit power controller, which receives operating power at the VCC terminal from auxiliary winding 303 and receives a current sense signal at a current sense node or terminal (CS) from a sense resistor Rsense coupled to power transistor Q.

As shown in FIG. 3, power controller 330 is also configured to receive other feedback signals at its current sense terminal (CS). A first feedback signal is provided by a first feedback circuit, Block A, which is coupled to auxiliary winding 304 and includes a control circuit labeled "I-V Control A" and a rectifying circuit including a diode and a capacitor. In an embodiment, Block A includes an output voltage sampling unit and signal process unit (not shown in FIG. 3). In some embodiments, a second feedback signal is provided by a second feedback circuit, Block B, which is coupled to auxiliary winding 303 and includes a control circuit labeled "I-V Control B" and a rectifying circuit including a diode and a capacitor.

In some embodiments of the invention, Block A is configured to modify the output I-V curve during the transition from the CV mode to the CC mode, and may lead to an I-V curve similar to curve 2 in FIG. 2. In an embodiment, Block B is configured to implement an I-V characteristic similar to curve 1 in FIG. 2, where Block B is configured to take effect when the output voltage decreases to a certain voltage to fold back the current. In FIG. 3, Vaux is a voltage from an auxiliary winding and represents a sampled signal related to the output voltage.

Depending on the embodiment, Block A and Block B may include a resistor divider to provide a required voltage signal or a mathematic unit according to certain I-V curve requirement. For example, Block A can be a circuit block implementing a mathematical function to modify the sampled output voltage Vo according to the desired I-V characteristics. In some embodiments, Block A and Block B can be configured to implement an additive, subtractive, multiplicative, integrating, or differential function. In a specific embodiment, Block A or Block B can provide sampled voltage signals to the CS pin. In other embodiments, the primary current can be varied in different ways, for example, by a quantity Vo*K, where K is an adjustable parameter. Further details of the operation of controller 330 and the feedback circuits, Block A and Block B, are described in details below.

Figure 4:
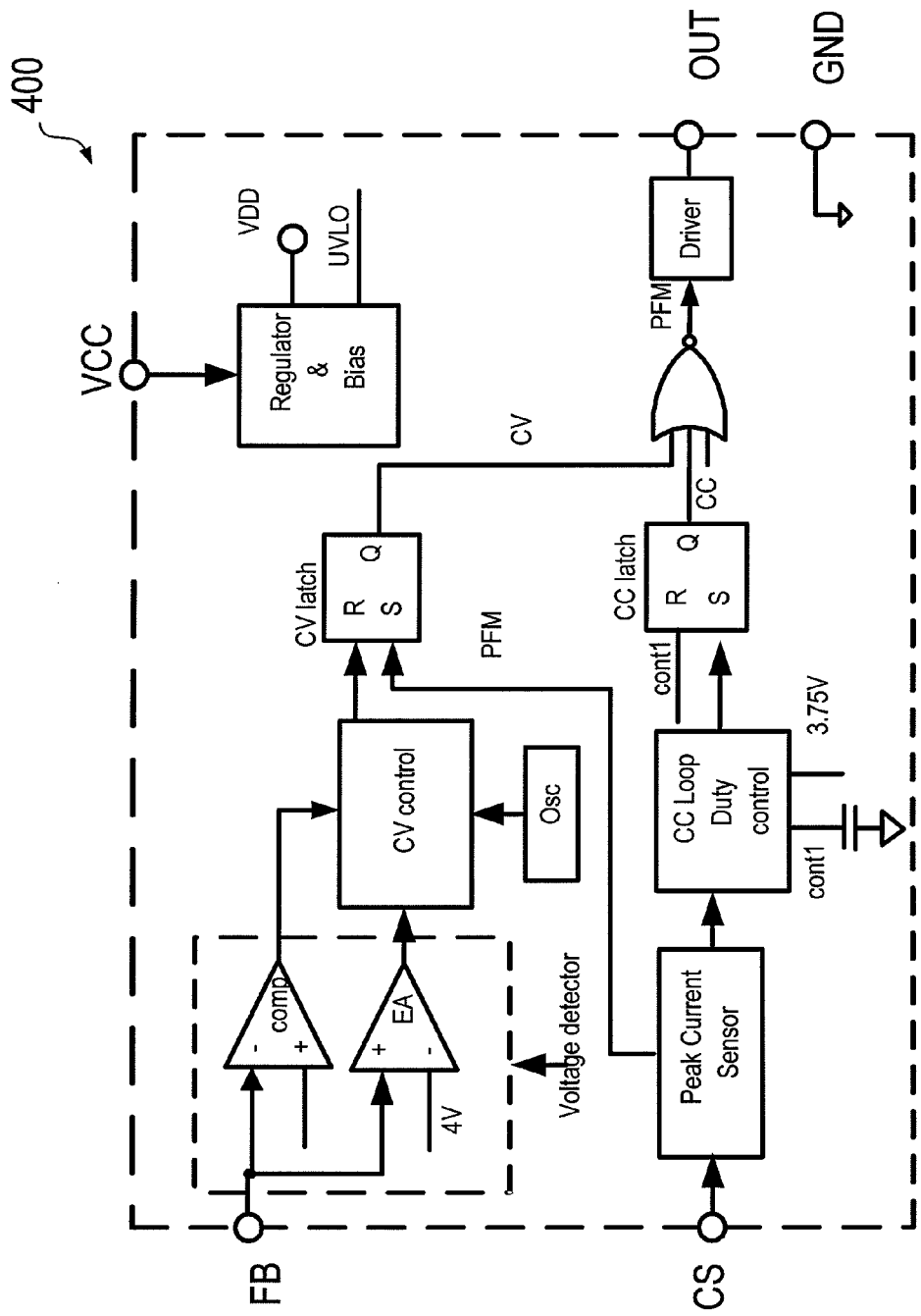
FIG. 4 is a simplified block diagram of a power controller integrated circuit that can be used in the power converter in FIG. 3 according to an embodiment of the present invention.

FIG. 4 is a simplified block diagram of a representative implementation of power controller 330 in power converter 300 of FIG. 3 according to an embodiment of the present invention. In an embodiment, controller 330 is an integrated circuit chip having the following pins:
VCC—for receiving an operating power supply;
FB—for receiving a feedback signal representing an output voltage on the secondary side of the transformer;
CS—for receiving a current sense signal representing a current in the primary winding;
OUT—for issuing a control signal to an external power transistor for controlling the current flow in the primary winding; and
GND—for providing an electrical ground.

As shown in FIG. 4, controller 330 has several functional circuit blocks. A DRIVER block has an output coupled to the OUT pin, which is coupled to the base of an external power transistor, e.g., transistor Q in FIG. 3. In this embodiment, the DRIVER block receives a "PFM" (pulse frequency modulated) control signal. The PFM control signal is determined, among other things, by a constant voltage (CV) signal and a constant current (CC) signal. As shown in FIG. 4, the CV signal is generated by circuit blocks including a voltage detector, a CV control circuit, an oscillator Osc, and a flip-flop CV Latch. The Voltage detector includes a comparator and an error amplifier EA. The CV signal is used for maintaining a constant output voltage in CV mode. Error amplifier EA compares the feedback signal from FB with reference voltages, such as the 4V shown in FIG. 4.

In the configuration shown in FIG. 4, the CC signal can be used for maintaining a constant output current in the constant current mode, and is generated by CC Loop Duty Control block and a flip-flop CC Latch. A capacitor cont1 and a reference voltage, e.g., 3.75V, are used for timing control in CC mode operations. Additionally, a Peak Current Sensor block senses a current in the primary winding provided by the CS pin and sends out signals to both the CV control circuit and the CC control circuit. In some embodiments, these signals are configured to turn off the control pulse when, e.g., the primary current reaches a predetermined reference level.

Figure 1:
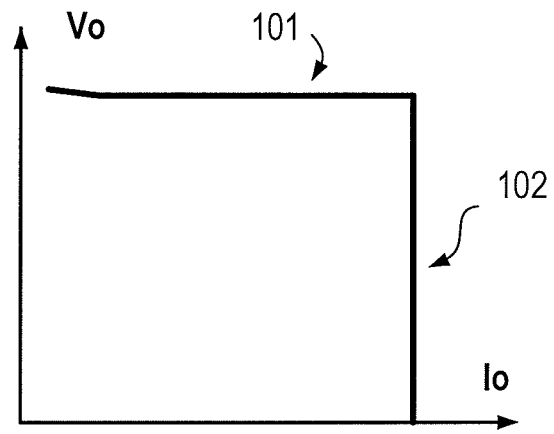
FIG. 1 is a simplified drawing illustrating a current-voltage (I-V) characteristic of a conventional power converter, including a constant voltage (CV) region and a constant-current (CC) region.
Figure 5:
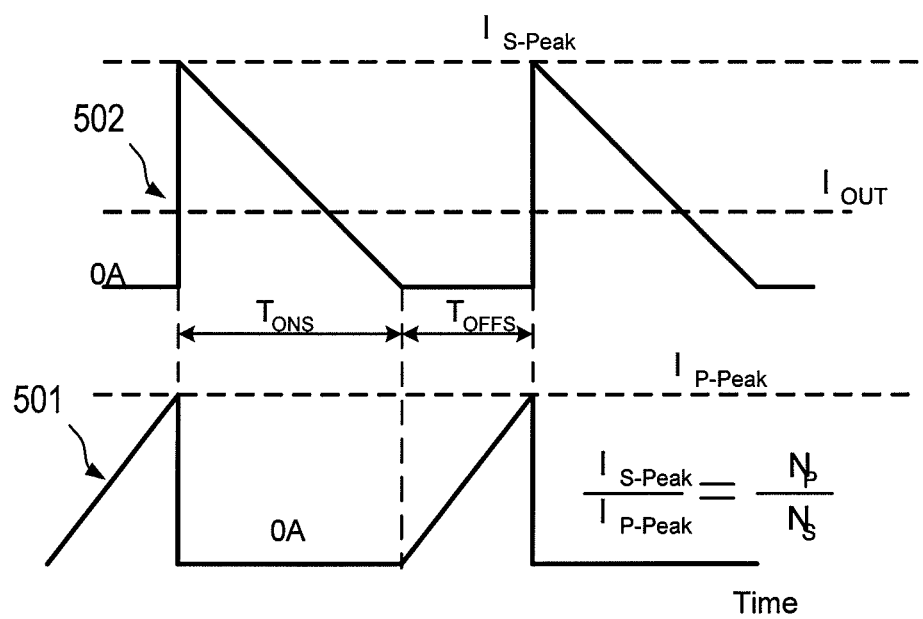
FIG. 5 is a simplified diagram illustrating the operation of the power converter of FIG. 4 in a constant-current (CC) mode according to an embodiment of the present invention.

The constant current (CC) mode operation is further illustrated in FIG. 5, which plots current flows in the primary and secondary windings in power supply 300 in FIG. 3. As shown, the current on the primary side 501 and the output current on the second side 502 are plotted as functions of time. Two operation cycles are indicated in FIG. 5, with each cycle divided into $T_{ONS}$ and $T_{OFFS}$, which designate the time periods in which the secondary current is on and off, respectively. The peak currents on the primary and secondary sides are designated as $I_{P\text{-}Peak}$ and $I_{S\text{-}Peak}$, respectively. The ratio of $I_{S\text{-}Peak}$ over $I_{P\text{-}Peak}$ is determined by the coil turn ratio between the primary side and the secondary side, Np/Ns. The average output current at the secondary side $I_{OUT}$ can be expressed by the following equation:

$$I_{out} = \frac{I_{P\_Peak}}{2} * \frac{N_p}{N_s} * D_{diode}, \text{ where } D_{diode} = \frac{T_{ons}}{T_{ons} + T_{offs}} \quad \text{Eq. 1}$$

where Ddiode is the secondary conduction duty, i.e., the fraction of time during which the secondary current flows. A typical I-V characteristic for power supply 300 in constant-current mode operation is illustrated in FIG. 1.

In Eq. 1, if the primary peak current $I_{P\text{-}Peak}$ and secondary conduction duty Ddiode are held constant, then the average output current at the secondary side $I_{OUT}$ is also a constant. Thus, a constant current (CC) mode of controller 330 can be achieved by CC Loop Duty Control block in FIG. 3 that is configured to hold $I_{P\text{-}Peak}$ and Ddiode constant.

In some embodiments, providing that the system is operating in the discontinuous mode (DCM), continuous mode (CCM) boundary DCM, or discontinuous mode boundary (DCMB), the relationship in Eq. 1 can be achieved. In some DCM applications, primary side regulators are used in CC mode, where primary current and secondary current are related in relative simple ways.

Embodiments of the invention provide methods and circuits that enable I-V characteristics that can be tailored for specific operations, such as curves 1 and 2 in FIG. 2. In the embodiments described below, circuit blocks Block A and Block B are included in power converter 300 to provide these functions.

Figure 6:
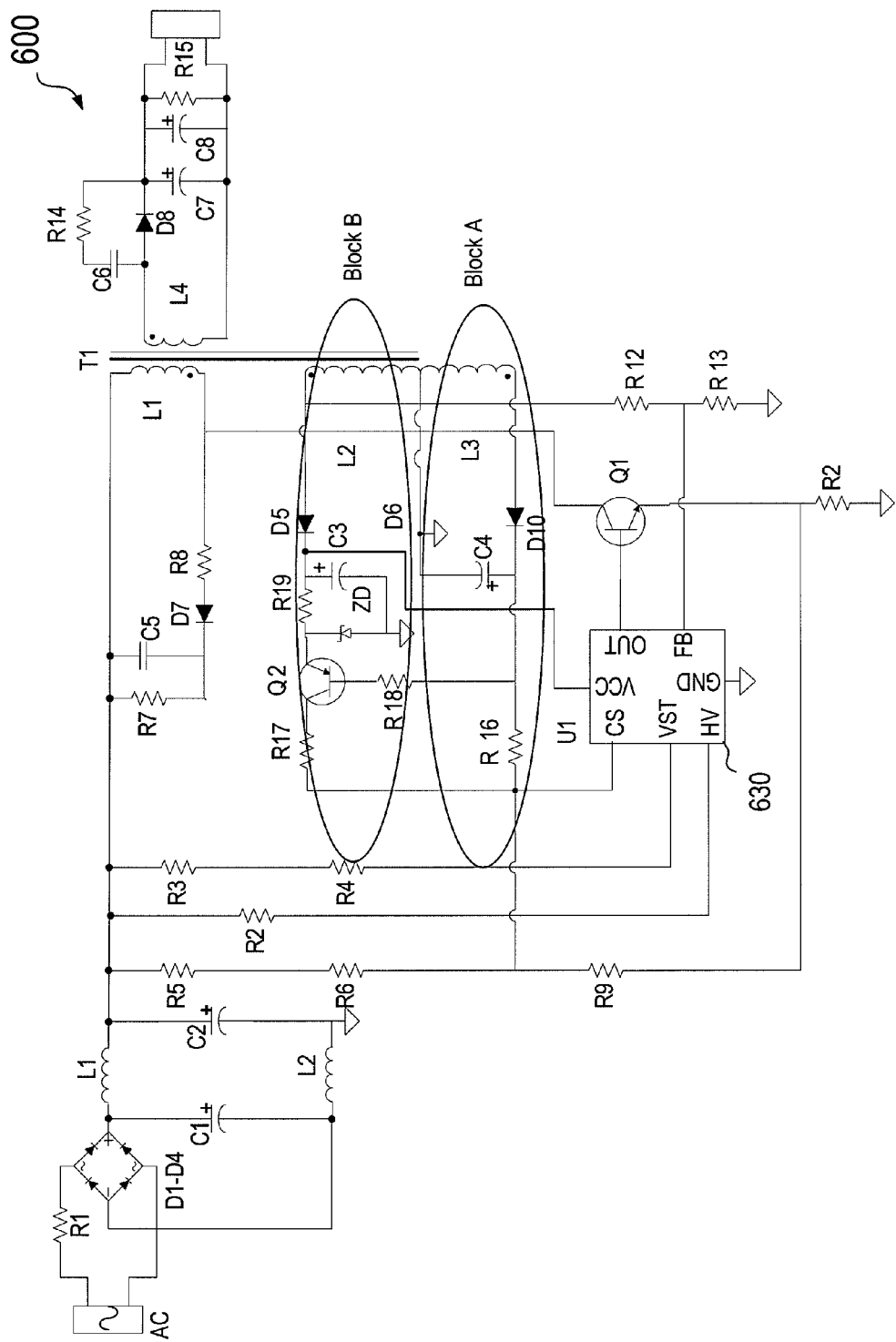
FIG. 6 is a simplified schematic diagram of a power converter according to an embodiment of the present invention.

FIG. 6 is a simplified schematic diagram of a power converter 600 according to an embodiment of the present invention. As shown, power converter 600 is similar to power converter 300 described above in connection with FIG. 3. For example, controller 630 in FIG. 6 is similar to controller 330 described above in conjunction with FIG. 4. Therefore, certain details in FIG. 6, such as the rectifying circuits and various resistance circuits, are not elaborated here. The description below will be focused on the circuitry for tailoring the output I-V characteristics involving, e.g., Block A, Block B, and controller 630.

In an embodiment, Block A in FIG. 6 is coupled to the transformer through output voltage sampling winding L3, and includes a rectifier diode D10, a filter capacitor C4, and a bias resistor R16. The position of an auxiliary winding, such as L3, may be disposed close to either the primary winding or the secondary output winding. Different positions and directions of the auxiliary winding can cause different coupling and will bring different induced voltages, which can affect the feature of output I-V curve. For example, when auxiliary winding L3 is close to the secondary output winding L4, the induced voltage Vaux can be expressed as:

$$V_{aux} = K1 * Vo + K4 \quad \text{Eq. 2}$$

where K1 and K2 are parameters determined by the coupling arrangement between the windings. As shown in FIG. 6, sampled voltage Vaux is coupled to the CS terminal of controller 630. In this case, the new $I_{P\text{-}Peak}$ can be expressed as follows:

$$I_{P\text{-}Peak} = I_{P\text{-}Peak\text{-}Origin} - (Vo * K1 + K2) \cdot \frac{R9}{R16 + R9} \quad \text{Eq. 3}$$

where $I_{P\text{-}Peak\text{-}Origin}$ is the original value of $I_{P\text{-}Peak}$ without the feedback signal derived from Vaux. From Eq. 3, it can be seen that, the peak current $I_{P\text{-}Peak}$ can be adjusted to decrease with increasing voltage Vo, leading to an I-V curve similar to curve 1 of FIG. 2. Moreover, parameters such as K1 and R16 can be used to adjust the slope of the I-V curve.

In FIG. 6, Block B is coupled to the transformer through bias winding L2 (VCC winding), and includes a rectifier diode D5, a filter capacitor C3, a bias resistor R17, and a comparator circuit including a Zener diode ZD1 and a transistor Q2. Here the reference voltage in the comparator is provided by Zener diode ZD1, but other reference regulators can also be used. The PNP transistor Q2 will be turned off when the sampled voltage from L2, Vaux, drops to a certain value, e.g., as determined by the Zener diode. Thus, the sampled voltage will increase, causing the peak current to fold back. The $I_{P\text{-}Peak}$ can be calculated as:

$$I_{P\text{-}Peak} = I_{P\text{-}Peak\text{-}Origin} - (Vo * K1 + K2) \cdot \frac{R9}{R16 + R9} - Vz1 \cdot \frac{R9}{R17 + R9} \quad \text{Eq. 4}$$

The value of resistor R17 can be used as a parameter to control the output current, and the Zener voltage of ZD1 can be used to adjust the fold back point. With Block A and Block B described above, curves such as curve 1 and curve 2 in FIG. 2 can be obtained.

Figure 7:
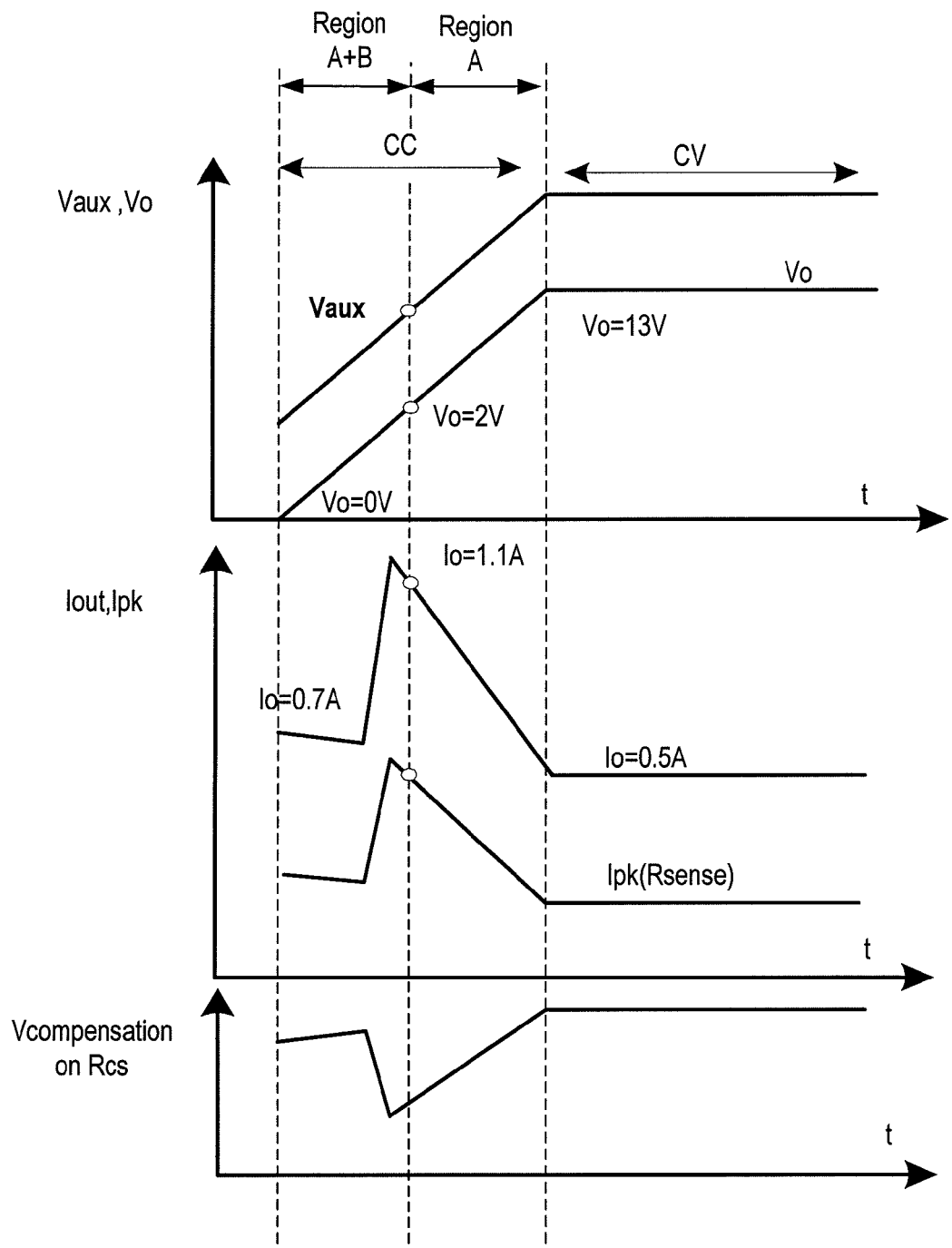
FIG. 7 is a simplified diagram illustrating the operation of the power converter of FIG. 6 according to an embodiment of the present invention.

FIG. 7 is a simplified diagram illustrating the operation of power converter 600 of FIG. 6 according to an embodiment of the present invention. In this example, the auxiliary winding is disposed close the secondary output winding. The upper diagram shows feedback voltage Vaux and output voltage Vo as a function of time. As can be seen on the left hand side of the upper diagram, Vaux and Vo increase with time in the constant current (CC) mode. When the output voltage Vo reaches a target, e.g., Vo=13V, the constant-voltage (CV) mode control takes over to maintain Vo at the target voltage.

In the CC mode, a substantially constant current can be maintained at the output. In addition, as described above, in embodiments of the invention, the relationship in CC mode can be tailored for specific applications. As shown in Eq. 3, when Block A is activated, the peak current in the primary winding $I_{P\text{-}Peak}$ decreases with increasing output voltage Vo. When both Block A and Block B are activated, the current starts to decrease with decreasing voltage after a fold back point, as described by Eq. 4.

In FIG. 7, the CC mode operation is further divided in Region A, where Block A is activated, and Region A+B, where Block A and Block B are activated. Merely as an example, Region A and Region A+B are separated at fold back point Vo=2V. As shown in the middle diagram, in Region A, output current Io and sensed current signal Ipk increase with decreasing Vo. In part of Region A+B, the current decreases with decreasing voltage.

In embodiments of the invention, the current in the primary winding is sensed by coupling to the CS terminal of the controller using a voltage at a sense resistor, e.g., Rsense in FIG. 3. When Block A, or both Block A and Block B, are activated, they introduce an additional voltage component to the CS terminal. The modified, or compensated, current sense signal is used for controlling the primary current. This additional voltage component is illustrated in the lower diagram in FIG. 7 as "Vcompensation on Rcs."

Figure 8:
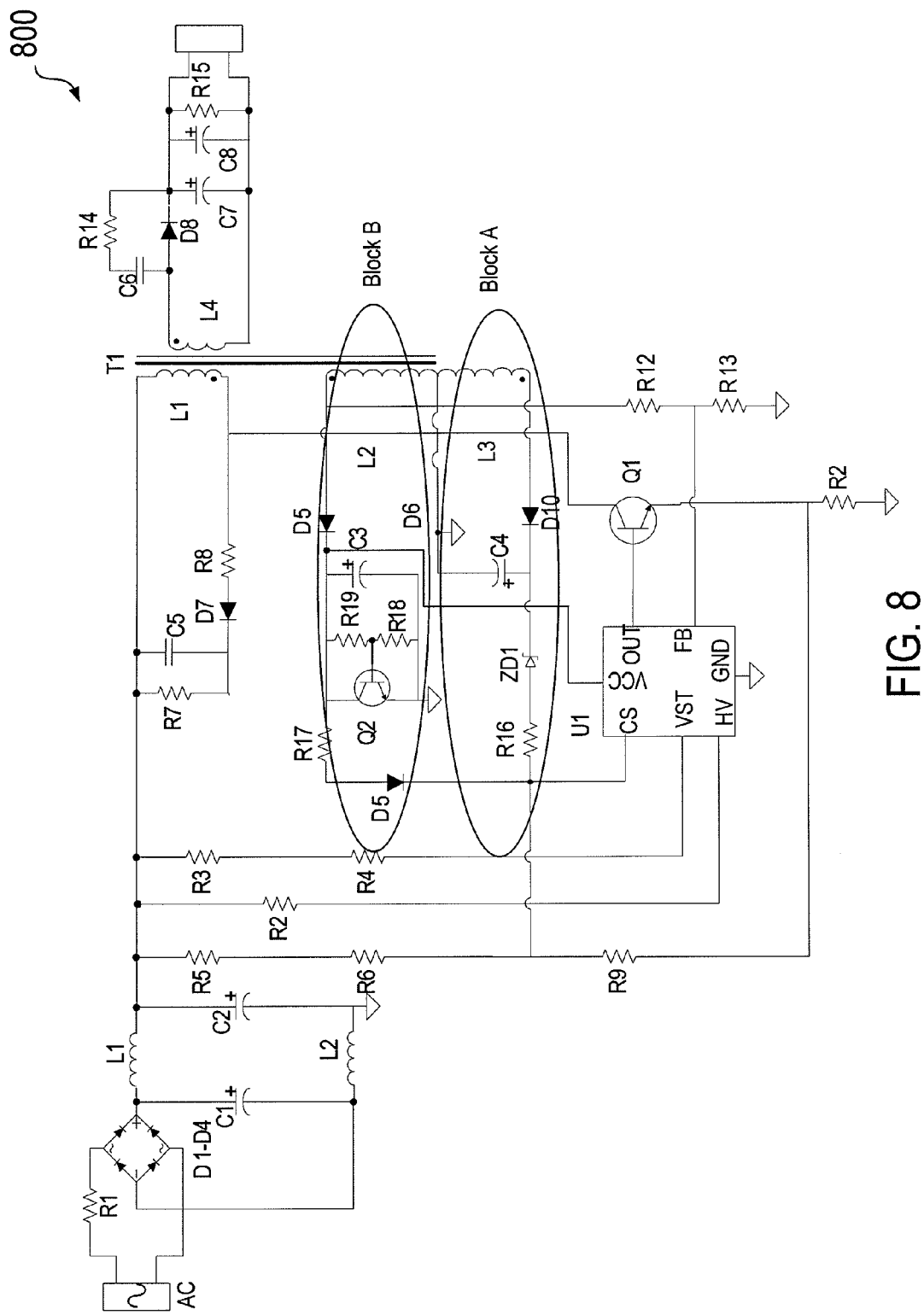
FIG. 8 is a simplified schematic diagram of a power converter according to an alternative embodiment of the present invention.

FIG. 8 is a simplified schematic diagram of a power converter 800 according to an alternative embodiment of the present invention. Converter 800 is similar to converter 600 described above in conjunction with in FIGS. 6 and 7, but with different circuit details in Block A and Block B. It is noted that in FIG. 8, a Zener device ZD1 is used in Block A and an NPN transistor Q2 is used in Block B to adjust CC transition point. The operation of converter 800 is otherwise similar to that of converter 600.

Figure 9:
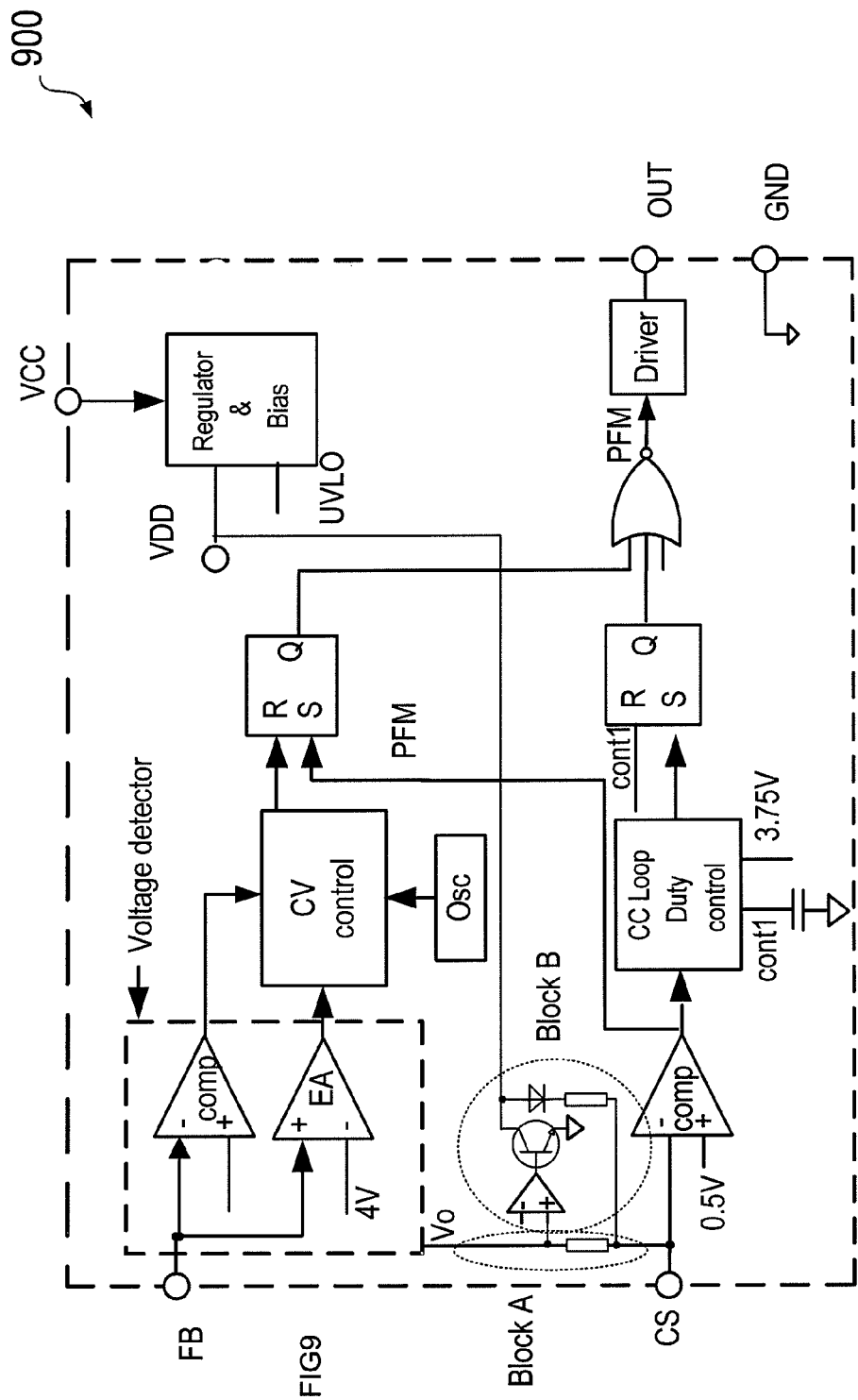
FIG. 9 is a simplified block diagram of an integrated circuit power controller according to another embodiment of the present invention.

FIG. 9 is a simplified block diagram of an integrated circuit power controller 900 according to another embodiment of the present invention. In the power converters described above, control circuitry such as Block A and Block B can be implemented outside a power controller integrated circuit chip, using either discrete components or separate integrated circuits. In the embodiment shown in FIG. 9, power controller 900 is a single integrated circuit configured to implement the desired I-V characteristics. In some embodiments, no additional auxiliary winding is needed.

As shown in FIG. 9, controller 900 has many components similar to those in controller 400 of FIG. 4. Therefore, detailed descriptions of these components are not repeated here. In FIG. 9, the output voltage information is sampled from the FB pin, and the sampled voltage Vo is coupled to the peak current sensor through Block A and Block B. In the example of FIG. 9, Block A includes a resistor, and Block B includes a comparator circuit, a transistor, a diode, and a resistor. Block B also receives a signal VDD, which is derived from the power supply voltage at pin VCC.

When block A is activated, the $I_{P-Peak}$ can be expressed as follows:

$$I_{P-Peak} = I_{P-Peak-Origin} - Vo*K4 \quad \text{Eq. 5}$$

where K4 is a parameter determined by the detailed circuit implementation. So the primary current becomes larger with the decreasing output voltage and average output current also becomes larger, similar to the characteristic depicted by curve 2 in FIG. 2.

When the block B is activated, the $I_{P-Peak}$ is:

$$I_{P-Peak} = I_{P-Peak-Origin} - Vo*K4 - VDD*K5 \quad \text{Eq. 6}$$

where K5 is another parameter determined by the detailed circuit implementation. Thus, the I-V characteristic depicted by curve 1 in FIG. 2, including lower output current at lower voltage in the CC mode, can be achieved through Block A and Block B.

As described above, the change of peak current according to the sampled voltage can be implemented using relatively efficient design and offers the benefit of accurate control in a large operating range. In some embodiments, a higher output current may lead to larger turn-off current at primary side, which could bring slightly more switching loss.

Figure 10:
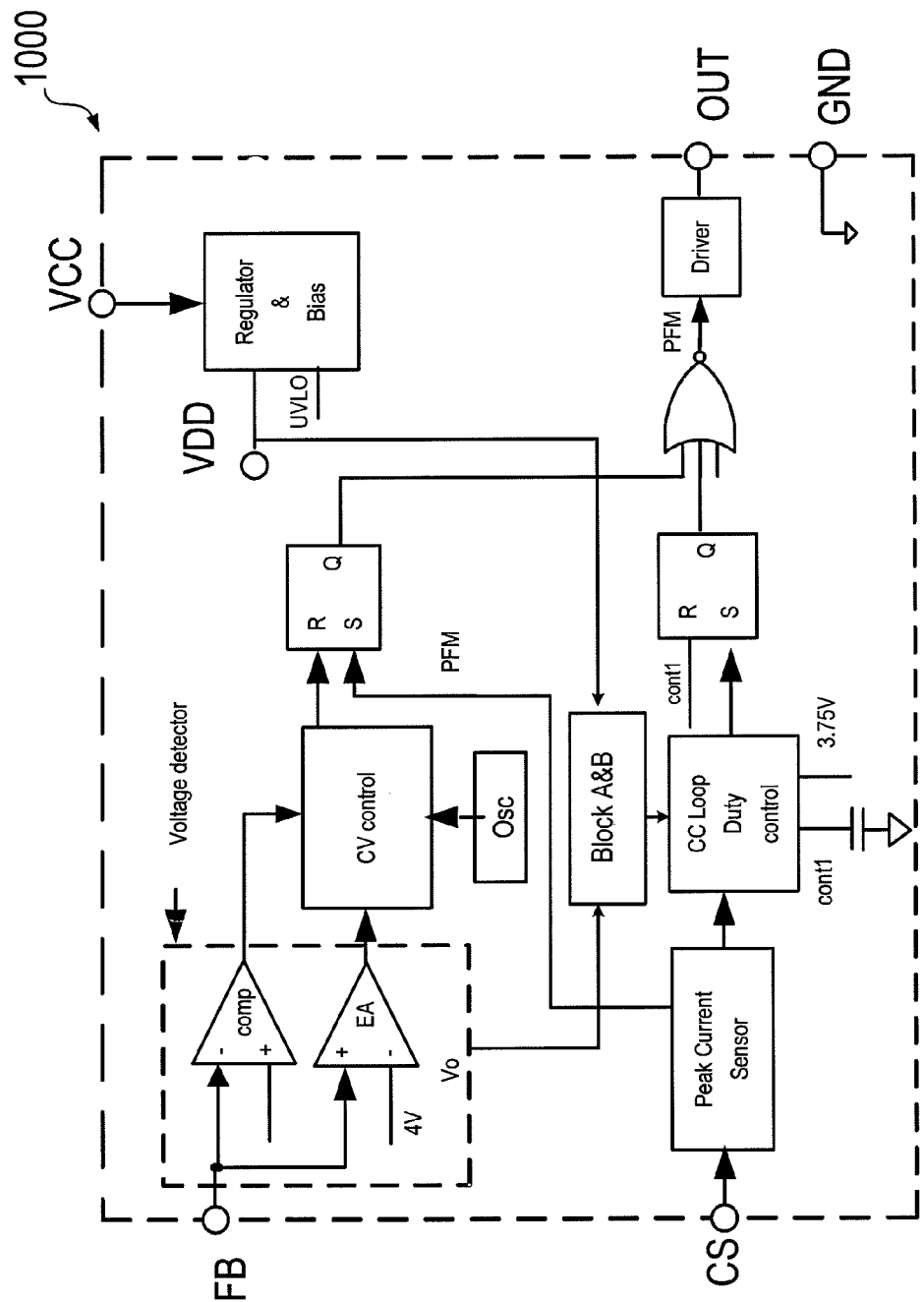
FIG. 10 is a simplified block diagram of a power controller integrated circuit according to an alternative embodiment of the present invention.

FIG. 10 is a simplified block diagram of a power controller integrated circuit 1000 according to an alternative embodiment of the present invention. In this embodiment, the power converter output current is controlled by the secondary conduction ratio, Ddiode, described above in conjunction with Eq. 1. As explained below, Ddiode can be configured to vary inversely with the output voltage in the CC mode, yet the primary peak current is kept fixed. As a result, the average output current is inversely proportional to the output voltage in the CC mode.

As shown in FIG. 10, controller 1000 has many components similar to those in controller 400 of FIG. 4. Detailed descriptions of these components are not repeated here. In FIG. 10, the voltage sampled through FB is coupled the CC duty control circuit block through Block A&B. In some embodiments, the output voltage is lower, and the secondary conduction duty is larger. As a result, the average output current is larger. In this design Block A&B can include similar circuits as Block A and Block B described above. A benefit of this design is that the primary peak current is not increased, so the flux density does not become higher at low Vo. In some embodiments, the secondary conduction ratio may be restricted with a max duty limitation.

Figure 11:
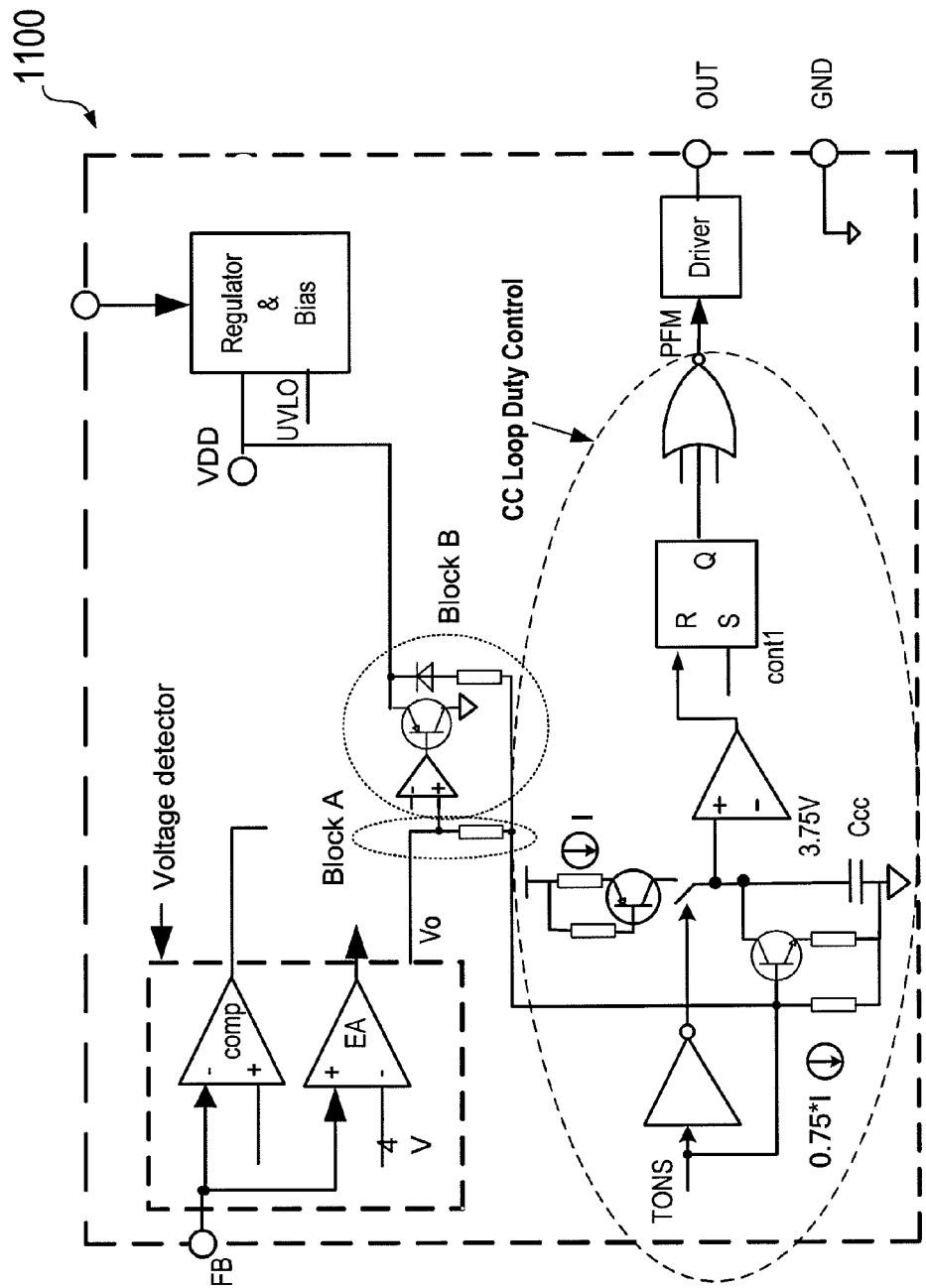
FIG. 11 is a simplified schematic diagram of a power controller integrated circuit according to another embodiment of the present invention.

FIG. 11 is a simplified schematic diagram of a power controller integrated circuit 1100 according to another embodiment of the present invention. Controller 1100 is similar to controller 1000 of FIG. 10, but includes a more detailed implementation of certain circuit blocks according to this specific embodiment, with some other features omitted in FIG. 11. As shown, the CC loop duty control circuit is configured to provide a PFM control signal with a conduction duty in constant current (CC) mode determined through the charging and discharging of a capacitor Ccc. In this embodiment, with a charging current I and discharging current 0.75*I, the secondary conduction ratio is I/(0.75I+I)=4/7.

In FIG. 11, the discharging current is modified by Block A and Block B, with the charge rate held unchanged. In an embodiment, Block A and Block B are similar to Block A and Block B in FIG. 9. Block A coupled sampled voltage Vo to the discharging circuit, and Block B coupled VDD to the discharging circuit. The new discharging current is:

$$I_{DISCHARGE} = (0.75 + K6*Vo)*I, \text{ and}$$

$$I_{DISCHARGE} = (0.75 + k6*Vo - k7*VDD)*I,$$

when the Block A and both Blocks A and B are activated, respectively. It follows that the secondary conduction ratio is:

$$D_{diode} = I/((0.75 + K6*Vo)*I + I) = 1/(0.75 + K6*Vo), \text{ and}$$

$$D_{diode} = 1/(0.75 + K6*Vo - K7*VDD),$$

respectively. As a result, I-V curves such as those shown in FIG. 2 can be obtained.

Figure 12:
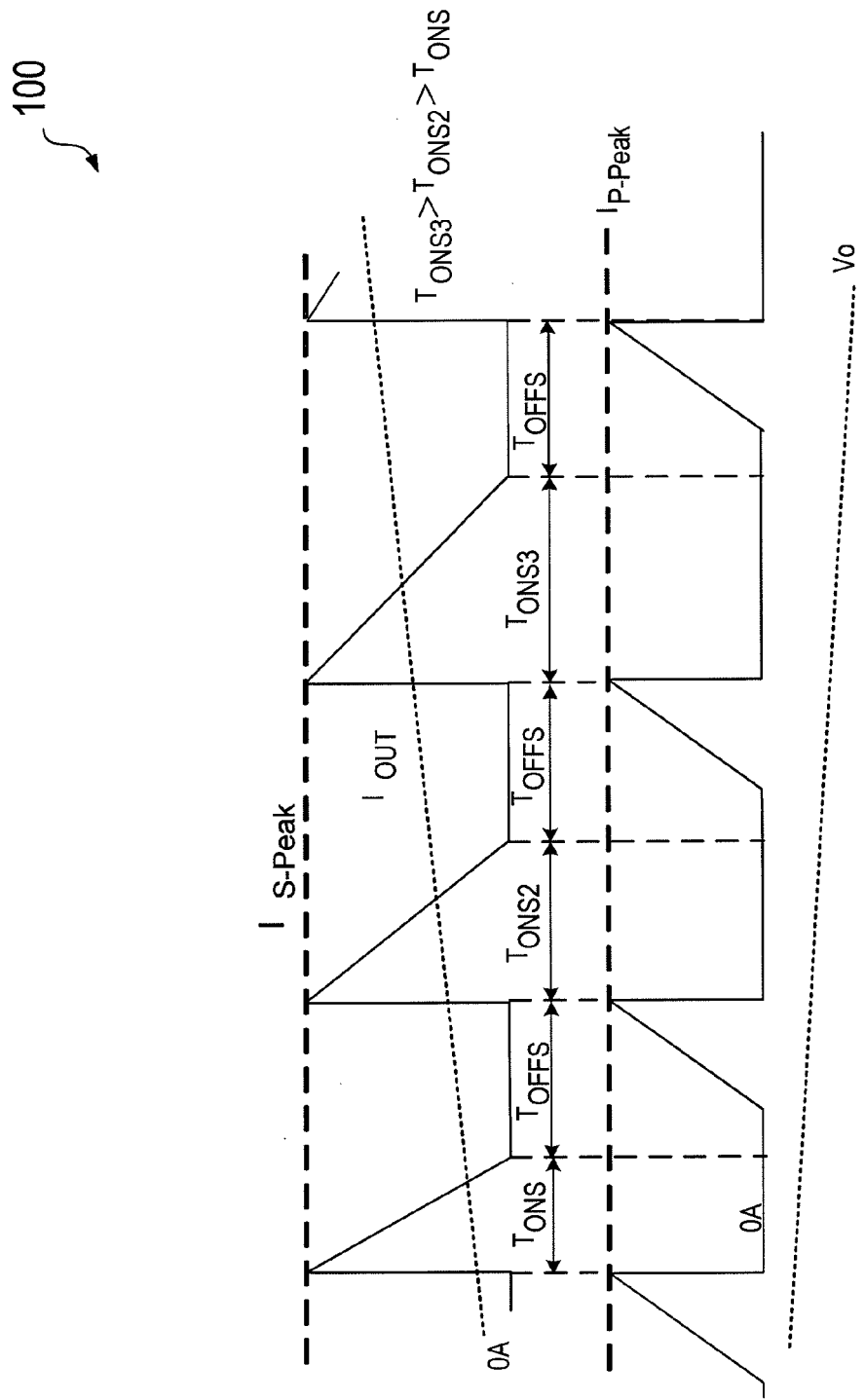
FIG. 12 is a simplified diagram illustrating the variation of currents in power converter incorporating the power controller integrated circuit of FIG. 11 according to an embodiment of the present invention.

FIG. 12 is a simplified diagram illustrating the variation of currents in a power converter incorporating the power controller integrated circuit 1100 of FIG. 11 according to an embodiment of the present invention. As shown, the peak primary and secondary currents, $I_{P-Peak}$ and $I_{S-Peak}$, are held constant, but the conduction cycle increases as the sampled output voltage Vo decreases. As a result, the output current $I_{OUT}$ increases as Vo decreases. As shown in FIG. 12, $T_{ONS}$ increases with decreasing Vo.

Figure 13:
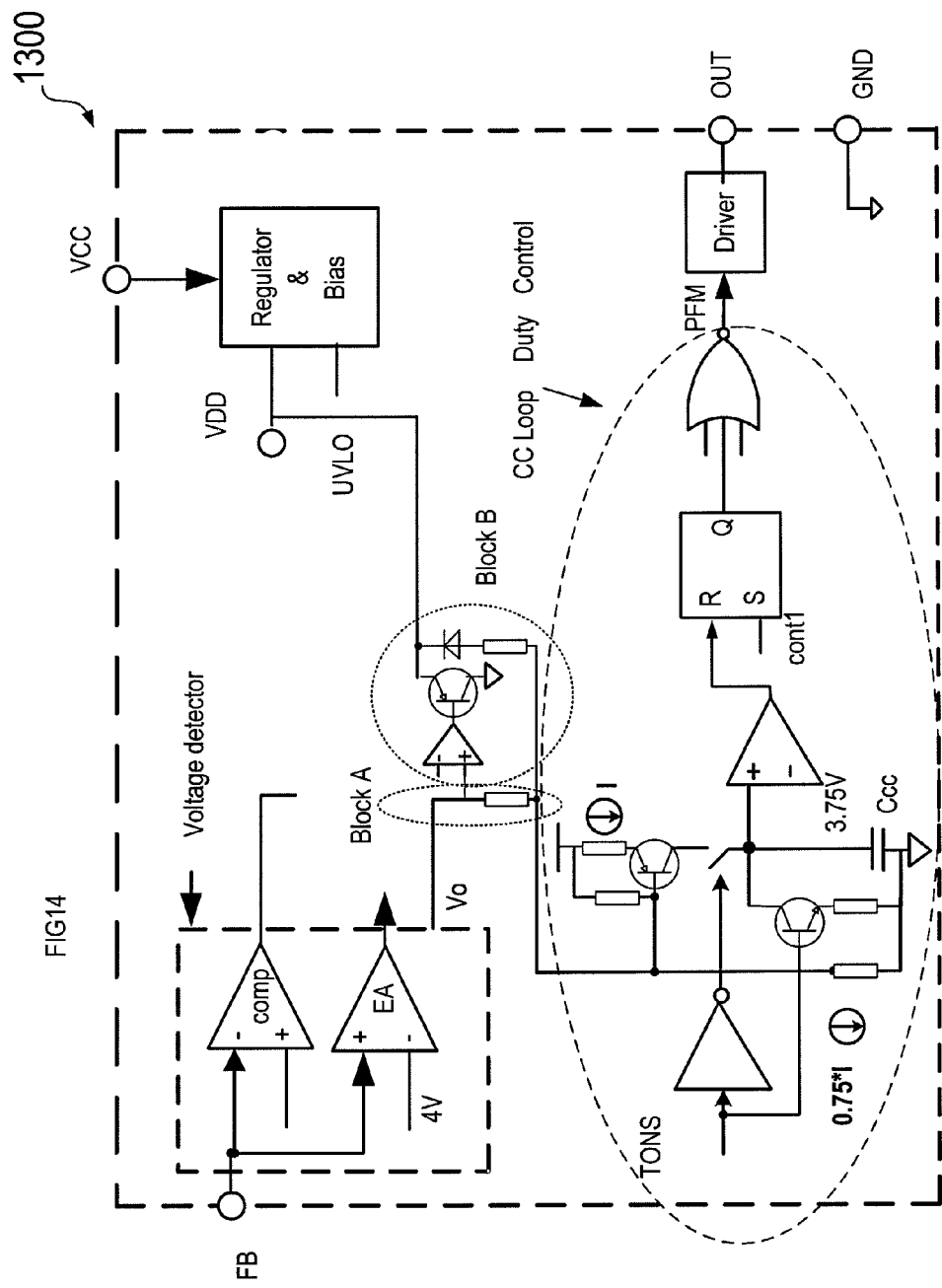
FIG. 13 is a simplified schematic diagram of a power controller integrated circuit according to another embodiment of the present invention.

FIG. 13 is a simplified schematic diagram of a power controller integrated circuit 1300 according to another embodiment of the present invention. Controller 1300 is similar to controller 1100 of FIG. 11, but the feedback signals provided by Block A and Block B are coupled to both the charging current and discharging current of capacitor Ccc.

Figure 14:
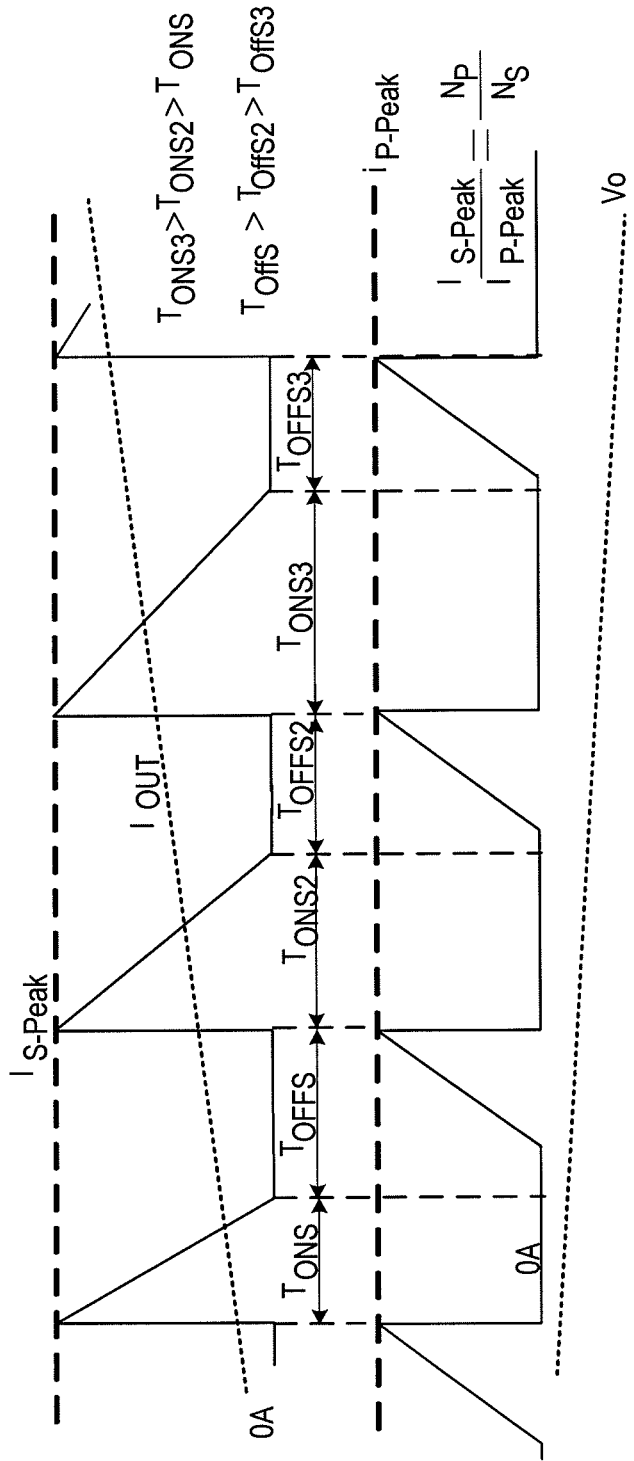
FIG. 14 is a simplified diagram illustrating the variation of currents in power converter incorporating the power controller integrated circuit of FIG. 13 according to an embodiment of the present invention.

FIG. 14 is a simplified diagram illustrating the variation of currents in power converter incorporating the power controller integrated circuit 1300 of FIG. 13 according to an embodiment of the present invention. As shown, the peak primary and secondary currents, $I_{P-Peak}$ and $I_{S-Peak}$, are held constant, but the conduction cycle increases as the sampled output voltage Vo decreases. Therefore, the output current $I_{OUT}$ increases as Vo decreases. In FIG. 14, both $T_{ONS}$ and $T_{OFFS}$ increase with decreasing Vo.

As described above, the output current can be modified by two parameters in the constant-current (CC) mode, namely, primary peak current $I_{P-Peak}$ and secondary conduction duty ratio Ddiode, In embodiments of the present invention, these two quantities are used to provide desired output I-V characteristics. In some embodiments, the invention provide methods to control the primary peak current $I_{P-Peak}$ during the CC mode, with the secondary conduction duty cycle Ddiode kept constant. In other embodiments, the secondary conduction duty cycle Ddiode can be configured to be a function of the secondary output voltage Vo with the primary peak current $I_{P-Peak}$ held constant.

In some embodiments, the methods described above can be combined to provide a desired output I-V characteristics. For example, a quantity based on a sampled output voltage can be used to modify both the peak current and the output duty cycle. In a specific example, a signal processing block, can be used to couple Vo or VCC to both the Peak Current Sensor block or the CC Loop Duty Control block to modify the output I-V characteristic, using methods similar to those described above While the preferred embodiments of the invention have been illustrated and described, it will be clear that the invention is not limited to these embodiments only. Numerous modifications, changes, variations, substitutions, and equivalents will be apparent to those skilled in the art without departing from the spirit and scope of the invention.

What is claimed is:

1. A method for controlling an output current of a power converter, comprising:
   receiving, at a current sense node, a current sense signal related to a current in a primary winding in the power converter;
   using the current sense signal to produce a constant-voltage control signal to regulate an output voltage according to a target voltage;
   using the current sense signal to produce a constant-current control signal having a constant duty cycle;
   limiting the current sense signal to be lower than or equal to a predetermined reference peak current; and
   adding a first signal to the current sense node to cause the output current to increase with decreasing output voltage, the first signal being related to the output voltage.

2. The method of claim 1, wherein modifying the current sense signal comprises adding the first signal to the current sense signal using at least a resistor.

3. The method of claim 1, further comprising modifying the current sense signal using a second signal related to the output voltage of the power converter to cause the output current to vary with the output voltage.

4. The method of claim 3, wherein the method causes the output current to:
   increase with decreasing output voltage until the output current reaches a maximum current in a first output voltage range; and
   be lower than the maximum current in a second output voltage range.

5. The method of claim 1, wherein the power converter is configured to maintain a conduction duty ratio, the method further comprising modifying the conduction duty ratio using at least a signal related to the output voltage of the power converter to cause the output current to vary with the output voltage.

6. A power converter, comprising:
   a primary winding for providing a primary current;
   a secondary winding for providing an output current and an output voltage;
   a power switch coupled to the primary winding;
   a pulse frequency modulation (PFM) control circuit that includes a constant voltage control block and a constant current control block for generating a PFM control signal to the power switch for controlling a current flow in the primary winding in a constant-voltage mode and a constant-current mode, respectively, wherein the constant voltage block is configured to regulate the output voltage according to a target voltage, and the constant current block is configured to produce a signal having a constant duty cycle;
   a current sense node for receiving a current sense signal related to the primary current, wherein the current sense signal is coupled to the constant voltage block for controlling a width of the PFM control signal, and the current sense signal is also coupled to the constant current block for controlling the constant current block; and
   a first circuit coupled to the current sense node and configured to add a first signal to the current sense node to cause a variation in the current sense signal, the first signal being constant in the constant-voltage mode and the first signal varying with the output voltage in the constant-current mode.

7. The power converter of claim 6, wherein the control circuit is configured to cause the output current to increase with decreasing output voltage.

8. The power converter of claim 6, wherein the first circuit and the control circuit are included in separate integrated circuit chips, the current sense node being coupled to a current sense pin of the control circuit chip.

9. The power converter of claim 6, further comprising a second circuit configured to modify the current sense signal using a second signal related to the output voltage of the power converter to cause the output current to vary with the output voltage.

10. The power converter of claim 9, wherein the converter is configured to:
    cause the output current to increase with decreasing output voltage until the output current reaches a maximum current in a first output voltage range; and
    cause the output current to be lower than the maximum current in a second output voltage range.

11. The power converter of claim 9, wherein the second circuit comprises a transistor, a Zener device, and a resistor.

12. The power converter of claim 9, wherein:
    the control circuit is included in a single integrated circuit chip; and
    the first circuit and the second circuit comprise discrete components.

13. The power converter of claim 6, wherein:
    the control circuit is further configured to maintain a conduction duty ratio; and
    the controller is further configured to modify the conduction duty ratio using at least a signal related to the output voltage of the power converter to cause the output current to vary with the output voltage.

14. The power converter of claim 6, wherein a peak current at the current sense node $I_{P-Peak}$ is expressed as $$I_{P-Peak} = I_{P-Peak-Origin} - Vo*K4$$

wherein $Vo*K4$ represents the first signal, and $I_{P-Peak-Origin}$ is the peak current at the current sense node without the first signal, wherein Vo is the output voltage and K4 is a parameter.

15. The power converter of claim 6, wherein a peak current at the current sense node $I_{P-Peak}$ is expressed as $$I_{P-Peak} = I_{P-Peak-Origin} - Vo*K4 - VDD*K5$$

wherein $Vo*K4-VDD*K5$ represents the first signal, and $I_{P-Peak-Origin}$ is the peak current at the current sense node without the first signal, wherein Vo is the output voltage and K4 is a first parameter, VDD is a rectified voltage in the PFM control circuit, and K5 is a second parameter.

16. A controller for a power converter, comprising:
    a constant voltage block including a comparator and an error amplifier, the constant voltage block being configured to generate a first control signal in response to an input signal related to an output voltage of the power converter;
    a constant current block including a first current source and a second current source for charging and discharging a capacitor, respectively, for producing a second control signal having a duty cycle related to a current ratio of the first and the second current sources; and a first circuit coupled to the constant current block and configured to add a third control signal to one or more of the first current source and the second current source of the constant current block to cause an output current of the power converter to vary with the output voltage, the third control signal being related to the output voltage.

17. The controller of claim 16, wherein the controller is configured to cause the output current to increase with decreasing output voltage.

18. The controller of claim 17, wherein the first circuit includes at least a resistor.

19. The controller of claim 16, wherein the controller is a pulse frequency modulation (PFM) controller.

20. The controller of claim 16, further comprising a second circuit coupled to the constant current block and configured to use the input signal to modify the second control signal to cause an output current of the power converter to vary with the output voltage.

21. The controller of claim 20, wherein the controller is configured to:
    cause the output current to increase with decreasing output voltage in a first output voltage range until the output current reaches a maximum current; and
    cause the output current to be lower than the maximum current in a second output voltage range.

22. The controller of claim 20, wherein the second circuit comprises a transistor, a Zener device, and a resistor.

23. The controller of claim 20, wherein the first circuit, the second circuit, and the control circuit are included in a single integrated circuit chip.

24. The controller of claim 20, wherein:
    the control circuit is included in a single integrated circuit chip; and
    the first circuit and the second circuit comprise discrete components.

* * * * *